UNITED STATES PATENT OFFICE.

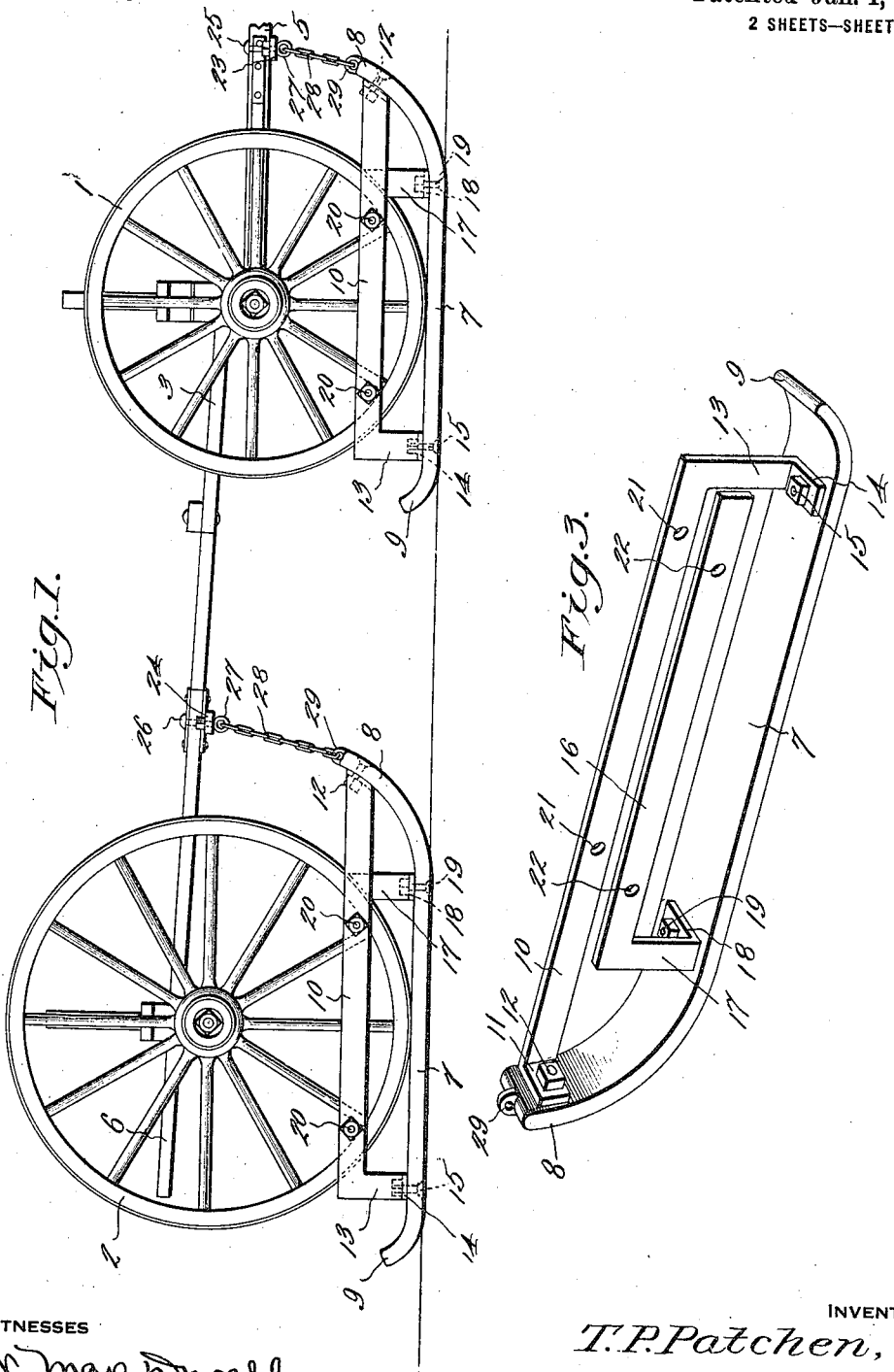

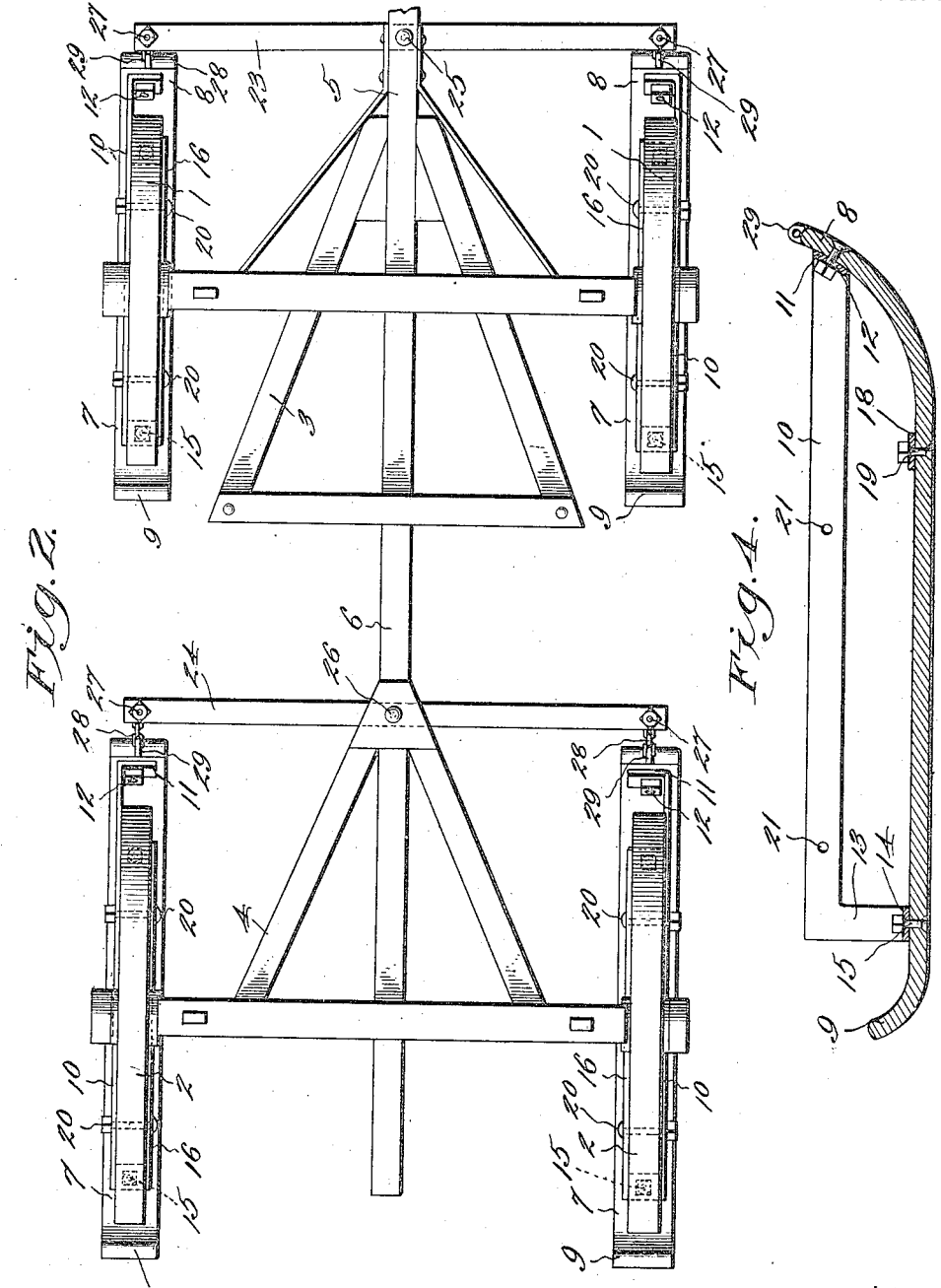

THOMAS P. PATCHEN, OF DUNLAP, IOWA.

SLED-RUNNER ATTACHMENT.

1,252,161.   Specification of Letters Patent.   Patented Jan. 1, 1918.

Application filed April 11, 1917.  Serial No. 161,230.

*To all whom it may concern:*

Be it known that I, THOMAS P. PATCHEN, a citizen of the United States, residing at Dunlap, in the county of Harrison and State of Iowa, have invented new and useful Improvements in Sled-Runner Attachments, of which the following is a specification.

This invention relates to improvements in sled runner attachments for attachment to the running gear and wheels of a wagon or other like vehicle to convert the wagon into a sled and without the necessity of removing the wagon wheels, the object of the invention being to provide improved attachments of this kind which are simple in construction and which may be readily attached to or detached from a wagon or other vehicle and the wheels thereof.

The invention consists in the construction, combination and arrangement of devices hereinafter described and claimed.

In the accompanying drawings:—

Figure 1 is an elevation of the running gear of a wagon provided with sled runner attachments constructed and arranged in accordance with my invention.

Fig. 2 is a plan of the same.

Fig. 3 is a detailed perspective view of one of the runners.

Fig. 4 is a detailed sectional view of the same.

For the purposes of this specification the front wheels of a wagon running gear are indicated at 1, the rear wheels at 2, the front hounds at 3, the rear hounds at 4, the tongue at 5 and the reach at 6.

In the embodiment of my invention I provide runners 7, one for each of the wheels. Each runner is made of steel or other suitable metal and has an upturned front end 8 and a slightly upturned rear end 9. A longitudinally arranged clamping bar 10 is provided near the outer side of each runner and has its front end formed with an inwardly turned arm 11 which is arranged transversely on the rear side of the upturned front end 8 of the runner and secured thereto by a bolt 12. Each clamping bar 10 has an inwardly turned standard 13 at its rear end at the lower end of which is an inwardly turned arm 14 which bears and is arranged transversely on the runner, at a point a suitable distance from the rear end of the runner and is secured on the runner by a bolt 15.

Each runner is also provided with an inner clamping bar 16 which is arranged longitudinally thereon and is provided at its front end with a downwardly turned standard 17 which has an outwardly turned arm 18 at its lower end. The said arm bears on the runner at a point a suitable distance from the front end of the runner and said bar 16 is pivotally mounted on the runner, for swinging movement in a horizontal plane, by means of a bolt 19 which passes through an opening in the said arm 18.

The runner may be readily placed below one of the wheels with its bar 10 arranged on the outer side of the wheel. The bar 16 is then turned on its pivot and caused to bear against the inner side of the wheel and the said bars 10 and 16 are then securely fastened to the wheel and caused to clamp the latter between them by means of bolts 20 which pass through openings 21, 22 with which said bars are respectively provided.

I also provide a front draft bar 23 for the front runners and a rear draft bar 24 for the rear runners. Said draft bars are respectively pivotally mounted under the front ends of the front and rear hounds by the bolts 25, 26 which respectively secure the hounds to the tongue and reach. Eye bolts 27 are pivotally mounted near the ends of the said draft bars. Draft chains 28 have their front ends attached to the eyes of said eye bolts and their rear ends attached as at 29 to the front ends of the runners.

This construction and arrangement of devices prevents the runners from communicating draft stresses to the wheels and also permits of vertical pivotal movements of the runners independently of one another to enable the runners to readily accommodate themselves to inequalities in the surface of the snow or ice. The draft bars may be readily attached to or detached from the wagon gear and the runners may be readily attached to or detached from the wheels.

While I have herein shown and described a preferred form of my invention I would have it understood that changes may be made in the form, proportion and construction of the several parts, without departing from the spirit of my invention and within the scope of the appended claim.

Having thus described my invention, I claim:—

A runner of the class described for attachment to the under side of a vehicle wheel and provided with a pair of longitudinally arranged clamping bars to receive the wheel between them, one of said clamping bars being pivotally mounted on the runner, and means to connect said clamping bars together and clamp the same on opposite sides of the wheel.

In testimony whereof I affix my signature.

THOMAS P. PATCHEN.

Copies of this patent may be obtained for five cents each, by addressing the "Commissioner of Patents, Washington, D. C."